July 10, 1928.  
J. S. WALLIS  
1,676,588  
LATERAL MOTION FOR AXLE BOXES  
Filed Aug. 15, 1925
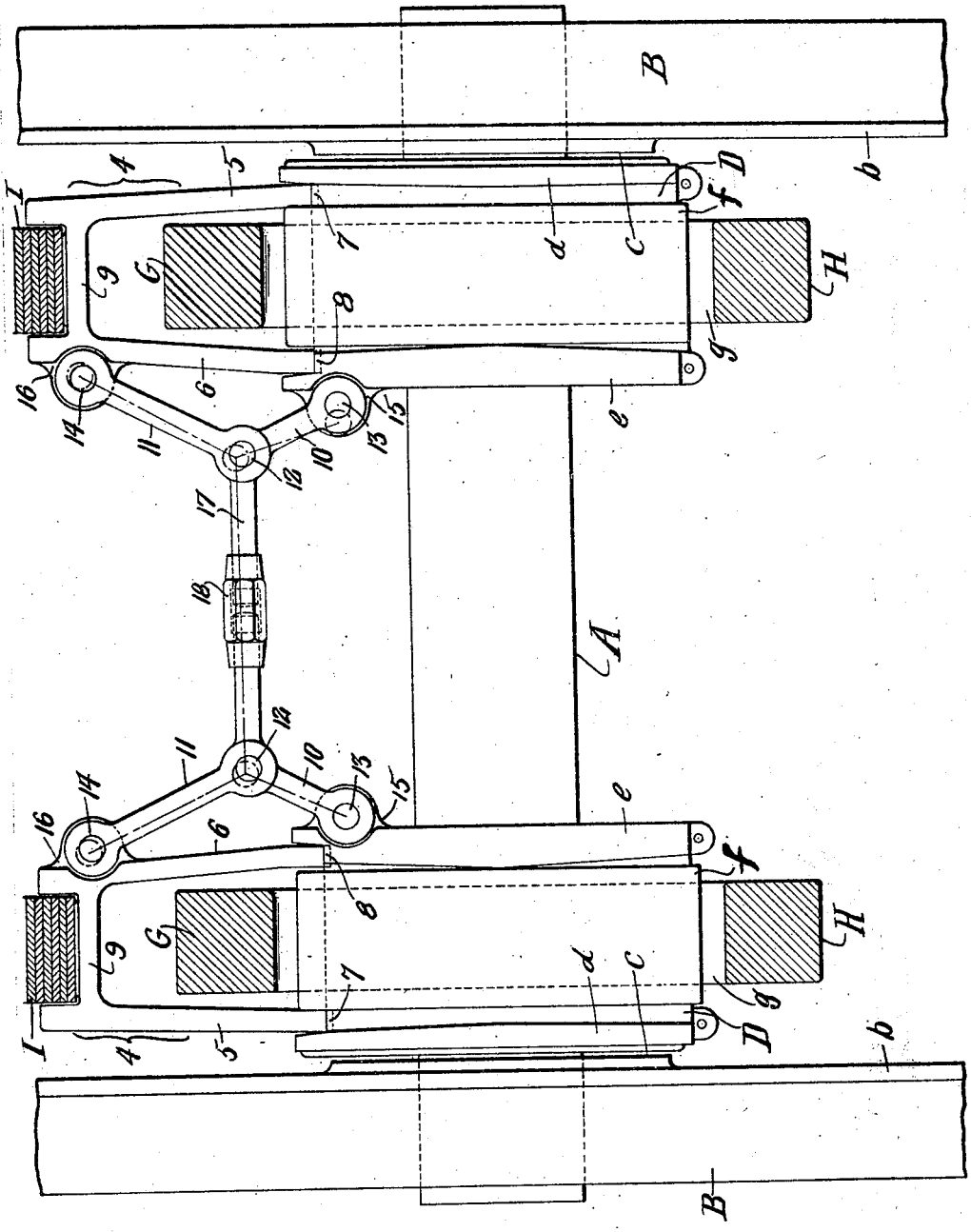

Patented July 10, 1928.

1,676,588

UNITED STATES PATENT OFFICE.

JOHN S. WALLIS, OF GREAT NECK, NEW YORK, ASSIGNOR TO FRANKLIN RAILWAY SUPPLY COMPANY, A CORPORATION OF DELAWARE.

LATERAL MOTION FOR AXLE BOXES.

Application filed August 15, 1925. Serial No. 50,347.

My invention relates to lateral motions for railway vehicle axle boxes, and is especially adaptable and advantageous for the driving boxes of locomotives. I aim to minimize stress and wear on the driving-wheel flanges, as well as on the lateral motion device or mechanism itself, and to reduce the weight of the mechanism as compared with those heretofore employed.

In realizing these and other advantages as hereinafter described, I preferably alter the action of the device as compared with existing practice; viz, instead of an increasing resistance and returning force as the box is displaced further and further laterally, I provide for a resistance and returning force which do not increase with the displacement, but rather diminish. Thus I obviate excessive stresses and wear on sharp curves. Preferably, I divide the take-up action for lateral displacement of either box between the lateral motion mechanisms of both boxes, thereby also reducing stresses and wear considerably.

The drawing is a fragmentary side view of a locomotive axle and associated parts (partly in transverse vertical section), showing a selected and preferred embodiment of my invention.

The drawing shows a locomotive axle A with drive wheels B, B having the usual flanges $b$, $b$, and hubs $c$, $c$, and also the driving boxes D, D, each with outer and inner flanges $d$ and $e$ for the shoes and/or wedges $f$ in the pedestal jaws $g$ of the corresponding main side frame G. The pedestal frame binder H is also shown. As shown, there is clearance between each part $f$ and the corresponding outer box flange $d$, to permit the corresponding box D to move inward under the thrust of its wheel hub $c$ on curves. In this instance, the load of the locomotive weight is transmitted from the springs I, I to the boxes D, D through saddle yokes 4 of inverted U shape, arranged with their outer and inner legs 5 and 6 straddling the frames G, G, and normally resting solidly in sockets 7, 8 in the boxes D, D. Each spring I rests in a trough-like fore and aft seat 9 in the upper member of the yoke 4.

As here shown, the lateral motion device for each box D comprises a toggle mechanism whose links 10 and 11 are pivoted together at 12 and pivoted to the box D and the saddle 4 at 13 and 14, respectively. In the present instance, the box pivot 13 is in a lug 15 adjacent the saddle leg socket 8 at the upper, inner corner of the box, and the saddle pivot 14 is in a lug 16 at the upper end of the saddle yoke 4, at the junction of the spring seat 9 with the inner leg 6. Inward movement of the toggle 10, 11 when the box D moves inward at a curve is resisted, said resistance operating to expand the toggle and lift the saddle portion 9 by rocking the saddle yoke 4 outward on its outer leg 5. This resistance may conveniently be afforded by a thrust member 17 pivoted to both toggle links 10, 11 by their interconnecting pivot 12. In the present instance, the member 17 does not act against a fixed abutment of any sort, such as a seat on the other box D or on the frame I,—but forms an interconnecting link between the two toggle pivots 12, 12. As shown, the member 17 is adjustable in length by means of a turnbuckle 18, so that any looseness or play developing in the mechanism from time to time may readily be taken up.

When the right hand box D is displaced laterally inward by the thrust of the wheel hub $c$ against it as the locomotive takes a curve, its pivot 13 moves inward correspondingly, as indicated in dot and dash line. Corresponding movement of the right-hand pivot 12 being resisted by the member 17, the right-hand toggle 10, 11 is partially straightened out or expanded, thus lifting the right-hand saddle pivot 14 (as also indicated in dot and dash) against the vehicle weight, and thereby bringing the load to bear in yielding opposition to the displacement of the box. As the lateral displacement of the box increases, however, the resistance of the vehicle weight in opposition becomes less and less, owing to the progressive straightening of the toggle 10, 11. Hence the stresses at the corresponding wheel flange $b$ and on the pivots 12, 13, 14 do not tend to reach excessive values, and wear is accordingly minimized.

When the locomotive passes from the curve on to tangent track again, the weight acts on the toggle to return the box D to normal position, with both saddle legs 5, 6 resting solidly in their seats 7, 8.

I have so far described the action as though the resistance of the member 17 to displacement of the right-hand toggle pivot 12 were absolutely solid and unyielding; but in the present instance, this is not the case. On the contrary, motion is transmitted from the right-hand pivot 12 to the left-hand pivot 12, thus forcing the latter outward and expanding that toggle,—all as indicated by the dot and dash pivot circles and center lines. Accordingly, the movement and the lift on the saddles 4, 4 tends to divide between the two sides of the locomotive, the exact ratio of division depending on the adjustment of the spring riggings and the division of weight between the saddles. With equality of adjustment and weights, the movement will be the same at both sides of the locomotive and the wear on the mechanism correspondingly less.

The mechanism is simple, light, rugged and inexpensive to manufacture and install. The pivotal connections or bearings can all be built with hardened pins and bushings that will wear relatively little in service and can easily be replaced when seriously worn.

What I claim is:

1. A railway vehicle lateral motion device comprising, in combination with an axle box and a member loaded with the vehicle weight, a toggle between said member and box, and means for automatically expanding the toggle against the vehicle weight in opposition to lateral displacement of the box.

2. A railway vehicle lateral motion device comprising, in combination with a spring saddle and axle box, leverage means for bringing the weight on the saddle to bear in yielding resistance to lateral displacement of the box, with diminishing resistance as the box moves further and further inward.

3. A railway vehicle lateral motion device comprising a toggle construction operating independently of the vehicle frame.

4. A railway vehicle lateral motion device comprising, in combination with a spring saddle and axle box, a toggle linkage between them for lifting the saddle when the box moves inward.

5. A railway vehicle lateral motion device comprising, in combination with an axle box and means for normally transmitting the load of the vehicle weight directly thereto, a toggle mechanism between the box and a load-transmitting member, and means for expanding the toggle when the box is displaced laterally and thereby bringing the load to bear in yielding resistance to such displacement.

6. A railway vehicle lateral motion device comprising, in combination with an axle box and a spring saddle yoke straddling the vehicle frame, with its legs normally resting on the box at either side thereof, a toggle between box and saddle at one side of the frame, and means for expanding the toggle and rocking the saddle outward on one leg in opposition to inward movement of the box.

7. A railway vehicle lateral motion comprising, in combination with an axle and its boxes and corresponding members loaded with the vehicle weight for transmission to the boxes, toggle mechanisms between the boxes and the corresponding load transmitting members, and means of interconnection between the toggles for expanding one of them in opposition to lateral displacement of either box.

8. A railway vehicle lateral motion comprising, in combination with an axle and its boxes and saddle yokes each normally resting on the corresponding box at opposite sides of the corresponding vehicle frame, toggles between the boxes and the corresponding yokes, and an adjustable cross-link interconnecting the toggles.

9. A railway vehicle lateral motion device comprising, in combination, a pair of oppositely spaced axle boxes, a member operatively associated with each of said axle boxes for distributing the load of the vehicle substantially equally therebetween, and means extending transversely between said boxes and the members associated therewith, said means being operative upon lateral displacement of one of said boxes to lessen the resistance which the load of the vehicle bears against both of said boxes.

10. A railway vehicle lateral motion device comprising, in combination, a pair of oppositely spaced axle boxes, a member operatively associated with each of said axle boxes for distributing the load of the vehicle substantially equally therebetween, and means pivoted to and interconnecting said boxes and the members associated therewith, said means being independent of the vehicle frame and operative upon lateral displacement of one of said boxes to raise both of said members.

11. An axle box lateral motion device including a toggle expansible upon lateral movement of the box.

12. In combination with a pair of axle boxes and weight transmitting members therefor, a pivoted V-structure operatively associated with each box and its weight transmitting member to form a triangle therewith, and a cross-connection between the apices of the triangles.

13. In combination with a pair of axle boxes and weight transmitting members therefor, a pivoted V-structure operatively associated with each box and its weight transmitting member to form a triangle therewith, and an adjustable cross-connection between the apices of the triangles.

In testimony whereof, I have hereunto signed my name.

JOHN S. WALLIS.